March 7, 1967   J. L. DAVIDSON   3,307,730
ALUMINUM PRESSURE VESSEL
Filed Jan. 29, 1965
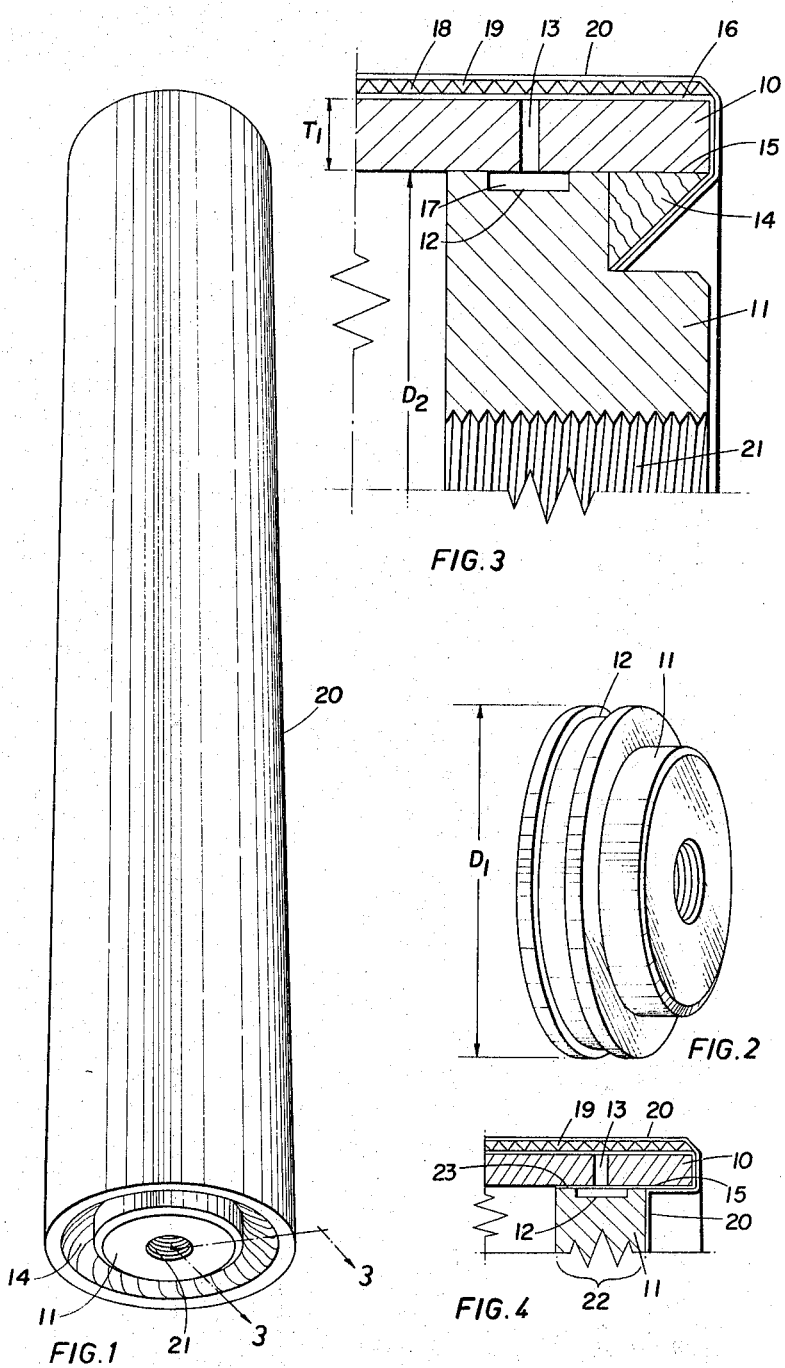
Inventor
JOHN LESLIE DAVIDSON
by: Cavanagh & Norman 3,307,730
ALUMINUM PRESSURE VESSEL
John Leslie Davidson, Oak Ridge, Tenn., assignor to Duralast Containers Limited
Filed Jan. 29, 1965, Ser. No. 428,991
Claims priority, application Canada, Feb. 17, 1964, 895,799
1 Claim. (Cl. 220—3)

This invention relates to a light weight pressure vessel and method of making same.

Pressure vessels, especially for use as containers for pressurized oxygen, propane and other gases, are usually fabricated from high tensile alloy steels resulting in a substantial weight per unit of volume of container or vessel. For example, the so-called portable gas containers in the form of oxygen bottles and the like are of an average weight in the range of between five and ten pounds per cubic foot in volume depending upon the intended maximum pressure for which the vessel is constructed. Such containers therefore tend to be especially unwieldly and the weight thereof may represent a substantial portion of the filled or charged weight of the container.

It is the main object of this invention to provide a pressure vessel of about two fifths of the weight of former pressure vessels of the same rupture capacity or limit.

It is a further object of the invention to provide a pressure vessel adapted to be made without the use of high pressure forming techniques or the drawing or hot forming of metal whereby to enable fabrication with simple equipment and low tooling cost.

It is a still further object of the invention to provide a pressure vessel adapted for easy repair or refinishing.

Having regard to the foregoing, the invention generally comprises:

An inner vessel envelope formed of relatively thin aluminum tubing having aluminum end walls rigidly fastened thereto; glass fibre reinforcing extended lengthwise of said container about said inner envelope and the end walls thereof; two layers of circumferentially tensioned windings of glass fibres, each of said layers being in the form of groups of fibers arranged in triangular section, said layers being adapted to interlay one layer with the other, and a coating of impregnated heat curable plastic resin extending throughout and between said fibers and defining an exterior surface for said windings and end walls.

Other objects of the invention will be apparent from a study of the following specification taken in conjunction with the accompanying drawings.

In the drawings:

FIGURE 1 is a perspective view of a pressure vessel according to the invention.

FIGURE 2 is a perspective view of an end wall adapted to receive a pressure fitting therein.

FIGURE 3 is a portional sectional view on the line 3—3 of FIGURE 1.

FIGURE 4 is a sectional view of a modified end wall fastening according to the invention.

In fabricating a pressure vessel of the invention a cylindrical tubular body 10 is first provided to the diameter and length desired and of a wall thickness $T_1$ of the order of between about $\frac{1}{50}$ and $\frac{1}{100}$ of the diameter. The harder the aluminum employed, the thinner may be the relative wall thickness. Wall thickness is necessary only to the degree providing sufficient rigidity for the walls in the following steps of fabrication. Thus, any one of a variety of aluminum alloys may be employed and especially it is desired to select a grade of aluminum or aluminum alloy having as a primary requirement rigidity rather than strength, although the two factors tend toward the selection of the same alloy. Any seamless aluminum tubing formed of an extrudable aluminum alloy of a class employed in aircraft applications having rigidity and strength will be found to be particularly suitable.

The end wall for the tube 10 is provided by two end plugs such as the end plug or wall 11 of a diameter $D_1$ adapted for press fit within the inner diameter $D_2$ of the tube 10. Observe that the end wall member 11 embodies a peripheral recess 12 adapted to be aligned with a radial bore or bores 13 of tube 10 for the introduction of a resin material to form a seal and fastening for the end wall in the tube 10.

In the form shown in FIGURE 3 a weld 14 joins end wall 11 to the inner end surface 15 of tube 10.

After forming of the weld 14 the outer surfaces of tube 10 are preferably wrapped longitudinally with glass fibre cloth strips 16 and held thereon with an epoxy resin spray coating. Just prior to application of said tape a suitable quantity of epoxy resin is injected into the annular recess or chamber 17 by way of bores or ducts 13 to fill the same. Preferably prior to setting of the epoxy resin on the longitudinal glass cloth strapping 16 the tube is wound with a first layer 18 of extruded triangular glass fibre cord of about $\frac{3}{16}$ inch per side triangular section for the full length of said tube being suitably impregnated with a resin and thereafter a second layer or course of the same glass fibre cord is wound thereon. The winding of the glass fibre cord is proceeded with a cord tension of about 14 lbs. or greater in order to provide for a permanent set and an initial tension elongation of the order of about 2%. Finally, an overlay epoxy resin spray coating 20 is applied for finishing purposes. After all coatings or at each coating step the epoxy resin is subjected to heat treatment for a suitable curing time at a temperature of about 310° F. for about thirty minutes. The relatively high baking temperature is preferred in order to effect a stress relieving on the metal or aluminum portion of the structure.

While in FIGURE 3 is shown an end wall having a central threaded bore 21 adapted to receive an outlet fitting as may be desired, it will be understood that the end wall at the opposite end of the container will be fully closed in that a plug will be in said threaded bore or no threaded bore will be provided.

It has been found that pressure vessels made according to this invention in a range of diameters between 3 inches and 7 inches have withstood internal pressure greater than 7,000 lbs. per square inch and up to 12,000 lbs. per square inch. A weight comparison with steel containers for the same class of service having regard to safety factor is the order of $\frac{2}{5}$ of the weight of a comparable steel container.

In FIGURE 4 is disclosed a modification of the invention in which the like numerals indicate like components but wherein the longitudinal glass cloth strapping is brought round the end of tube 10 to overlie the inner end surface 15 of the tube 10 over an area 22 adapted to underlie the peripheral surfaces of end wall 11. The area of the peripheral surfaces of the end wall is so great as to provide a total sheer stress at the bonding of said end wall to the inner cloth surface 23 of a very low order. By this means a 1 inch bonding width for area 22 will provide less than the order of 2,500 lbs. per square inch sheer stress at internal pressures of the order of 10,000 lbs. per square inch in vessels of the order of 6 inch internal diameter. With twice this bonding area achieved by making the area dimension 21 larger, that is, a thicker end wall, the sheer stress may be brought to less than 1,000 lbs. per square inch, being wholly satisfactory for a bonding sheer stress of the bonding of the cloth to the aluminum with an epoxy resin bond. However, for very high pressure applications, that is above 5,000 lbs. per square inch, an end weld is to be preferred.

It is intended that the present disclosure should not be construed in any limiting sense other than that indicated by the following claims, having regard to the state of the art set forth herein.

What I claim is:

A light weight pressure vessel comprising: an inner vessel envelope formed of relatively thin aluminum tubing having aluminum end walls rigidly fastened thereto; glass fibre reinforcing strips extending lengthwise of said container about said inner envelope and the end walls thereof; two layers of circumferentially tensioned cord windings of glass fibres, each of said windings being in the form of groups of fibres arranged in triangular section, said windings being adapted to interlay one with the other, a coating of impregnated heat curable plastic resin extending throughout and between said fibres and defining an exterior surface for said windings and end walls the lengthwise reinforcing being continued within the inner surface of the end portions of said tubing, and said end walls being of a diameter and thickness adapted for a press fit within the ends of said tube to impinge said glass fibre in the reinforcing in the inner surfaces thereof over a predetermined area; and a heat curable resin bonding the peripheral surfaces of the said end walls and the glass fibre reinforcing impinged thereby on the inner surfaces of said end portions of the tubing.

References Cited by the Examiner

UNITED STATES PATENTS

| | | | |
|---|---|---|---|
| 559,968 | 5/1896 | Brooks | 138—134 |
| 2,744,043 | 5/1956 | Ramberg | 220—3 |
| 3,002,534 | 10/1961 | Noland | 220—3 |
| 3,124,001 | 3/1964 | Conley | 220—3 |
| 3,137,405 | 6/1964 | Gorcey | 220—3 |
| 3,171,563 | 3/1965 | Bernd | 220—3 |

THERON E. CONDON, *Primary Examiner.*

RAPHAEL H. SCHWARTZ, *Examiner.*